United States Patent
Ravise et al.

(10) Patent No.: US 11,638,972 B2
(45) Date of Patent: May 2, 2023

(54) METHOD FOR MANUFACTURING A POROUS LAYER OF AN ACOUSTIC ATTENUATION STRUCTURE, POROUS LAYER OF AN ACOUSTIC ATTENUATION STRUCTURE THUS OBTAINED AND ACOUSTIC ATTENUATION STRUCTURE COMPRISING SAID POROUS LAYER

(71) Applicant: Airbus Operations (S.A.S.), Toulouse (FR)

(72) Inventors: Florian Ravise, Saint-Herblain (FR); Florent Mercat, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 399 days.

(21) Appl. No.: 16/841,973

(22) Filed: Apr. 7, 2020

(65) Prior Publication Data
US 2020/0316723 A1 Oct. 8, 2020

(30) Foreign Application Priority Data

Apr. 8, 2019 (FR) ...................................... 1903714

(51) Int. Cl.
*B23K 26/38* (2014.01)
*B23K 26/382* (2014.01)
*F02C 7/045* (2006.01)
*B23K 101/00* (2006.01)
*B23K 103/16* (2006.01)
*B64D 33/02* (2006.01)

(52) U.S. Cl.
CPC ............ *B23K 26/382* (2015.10); *F02C 7/045* (2013.01); *B23K 2101/001* (2018.08); *B23K 2103/166* (2018.08); *B32B 2307/10* (2013.01); *B64D 2033/0206* (2013.01)

(58) Field of Classification Search
None
See application file for complete search history.

(56) References Cited

U.S. PATENT DOCUMENTS

| 9,390,702 | B2* | 7/2016 | Mathur | G10K 11/168 |
| 2006/0088690 | A1 | 4/2006 | Arakawa et al. | |
| 2013/0040117 | A1* | 2/2013 | Porte | F02C 7/045 428/201 |
| 2016/0243654 | A1* | 8/2016 | Hu | B23K 26/382 |
| 2017/0341186 | A1* | 11/2017 | Hakuta | G10K 11/162 |
| 2018/0182369 | A1* | 6/2018 | Ravise | B64C 7/02 |

OTHER PUBLICATIONS

French Search Report for Application No. 1903714 dated Nov. 19, 2019.

* cited by examiner

*Primary Examiner* — Daniel J. Schleis
(74) *Attorney, Agent, or Firm* — KDW Firm PLLC

(57) ABSTRACT

A method for manufacturing a porous layer of an acoustic attenuation structure, porous layer of an acoustic attenuation structure thus obtained and acoustic attenuation structure comprising the porous layer. A method for manufacturing a porous layer of an acoustic attenuation structure includes a first step of production of a solid layer including at least one structural frame embedded in a resin matrix and having first and second reinforcing strips arranged so as to delimit zones without reinforcing strips and a second step of production of through-holes in the zones without reinforcing strips of the solid layer using a laser beam.

9 Claims, 4 Drawing Sheets

METHOD FOR MANUFACTURING A POROUS LAYER OF AN ACOUSTIC ATTENUATION STRUCTURE, POROUS LAYER OF AN ACOUSTIC ATTENUATION STRUCTURE THUS OBTAINED AND ACOUSTIC ATTENUATION STRUCTURE COMPRISING SAID POROUS LAYER

CROSS-REFERENCE TO RELATED APPLICATION

This application claims the benefit of and priority to French patent application number 19 03714 filed on Apr. 8, 2019, the entire disclosure of which is incorporated by reference herein.

TECHNICAL FIELD

The disclosure herein relates to a method for manufacturing a porous layer of an acoustic attenuation structure, to a porous layer of an acoustic attenuation structure thus obtained and to an acoustic attenuation structure comprising such a porous layer.

BACKGROUND

According to an embodiment that can be seen in FIG. 1, a propulsive assembly 10 of an aircraft 12 comprises a nacelle 14 and a turbine engine 16, positioned inside the nacelle 14. The latter comprises an air inlet 18 making it possible to channel an airstream 20 towards the turbine engine 16, as illustrated in FIG. 2. This air inlet 18 comprises a lip 22 prolonged inward by an internal wall 24 delimiting an internal duct 26 channeling the airstream 20 towards the turbine engine 16 and outward by an external wall 28. Certain surfaces of the nacelle 14 and of the turbine engine 16 comprise acoustic attenuation structures 30 to attenuate the sound nuisances.

According to a first embodiment that can be seen in FIG. 3, an acoustic attenuation structure 30 comprises a porous layer 32 in contact with the airstream 20 in which soundwaves are propagated, a cellular layer 34 and a reflective layer 36. According to another embodiment, an acoustic attenuation structure comprises a first porous layer in contact with the airstream 20, two cellular layers, a second porous layer called septum inserted between the two cellular layers and a reflective layer.

Each porous layer 32 is a metal sheet or a sheet made of composite material, with a thickness of between 0.1 mm and 5 mm, having a plurality of through-holes 38 having a diameter of 0.7 to 2 mm. To reduce the drag induced by the holes 38, the latter must have the smallest possible diameter and must be provided in large numbers to obtain an open surface ratio that can be greater than 10%. When the porous layer 32 is made of composite material, it comprises a plurality of fibers distributed uniformly in the resin matrix.

According to a first procedure, the holes 38 are produced by mechanical drilling. Given the large number of holes 38, it is necessary to provide several tens of drilling hours to obtain one porous layer 32.

According to a second procedure that can be seen in FIG. 4, the holes 38 are produced by ablation by using a laser beam. To avoid the risks of damaging the porous layer 32 by burning, the holes 38 are produced in several passes P1 to P10 in order to reduce the heating. Since the number of passes can reach ten and given the large number of holes 38, this second procedure has a production time that is as great as the first.

SUMMARY

The disclosure herein aims to wholly or partly remedy the drawbacks of the prior art by proposing a solution that reduces the time to produce a porous layer.

To this end, the subject of the disclosure herein is a method for manufacturing a porous layer of an acoustic attenuation structure, characterized in that it comprises a first step of production of a solid layer comprising at least one structural frame having first reinforcing strips that are parallel and spaced apart from one another, and second reinforcing strips that are parallel and spaced apart from one another and secant with the first reinforcing strips, the first and second reinforcing strips delimiting zones without reinforcing strips, the structural frame being embedded in a resin matrix filling at least the zones without reinforcing strips and a second step of production of through-holes in the zones without reinforcing strips of the solid layer, to obtain the porous layer, using a laser beam parameterized to produce holes and for a temperature in the zones of impact of the laser beam to be maintained within a range of temperatures greater than a sublimation temperature of the resin of the matrix.

This manufacturing method makes it possible to obtain a porous layer using a laser beam with a low number of passes, thus reducing the time to manufacture the porous layer.

According to another feature, the laser beam is parameterized so that the temperature in the impact zones is maintained within a range of temperatures less than a temperature of alteration of the fibers of the structural frame or frames.

According to another feature, the through-holes are produced by a sweep of the laser beam only vertically above the zones without reinforcing strips.

According to another feature, the solid layer is obtained by stacking at least one structural frame and at least one resin film on a deposition surface conformed according to the geometry of the porous layer to be produced then by consolidating them.

According to another feature, the through-holes are spaced apart so that the porous layer has an open surface ratio of between 4 and 18%.

According to another feature, the first and second reinforcing strips are regularly spaced apart by a distance of between 2 and 10 mm.

According to another feature, the first and second reinforcing strips have a width of between 1 and 7 mm.

According to another feature, the first and second reinforcing strips have a thickness of between 0.4 and 1.5 mm.

According to another feature, the laser beam is parameterized to produce holes of which at least one of the dimensions is less than 1 mm.

Also, a subject of the disclosure herein is a porous layer for an acoustic attenuation structure obtained from the method according to one of the preceding features and an acoustic attenuation structure comprising at least one such porous layer.

BRIEF DESCRIPTION OF THE DRAWINGS

Other features and advantages will emerge from the following description of the disclosure herein, the description being given purely by way of example, in light of the attached drawings in which.

DETAILED DESCRIPTION

Figure 1:
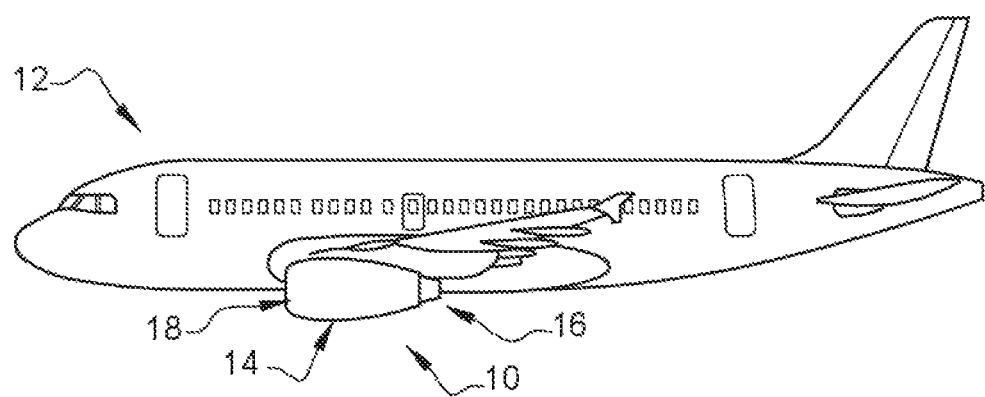
FIG. 1 is a side view of an aircraft.
Figure 2:
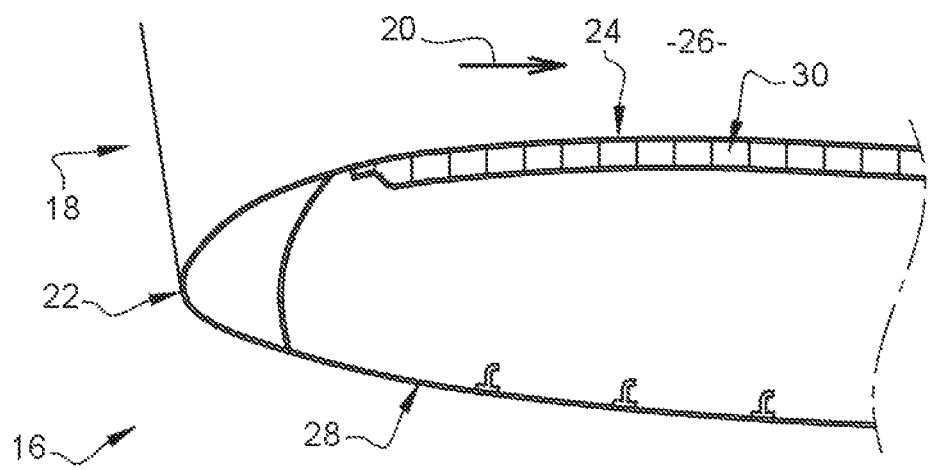
FIG. 2 is a longitudinal cross section of an air inlet of an aircraft nacelle.
Figure 3:
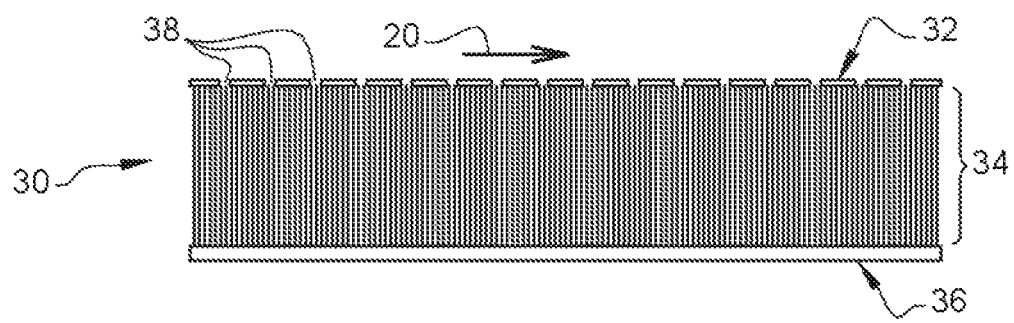
FIG. 3 is a cross section of an acoustic attenuation structure which illustrates an embodiment.
Figure 4:
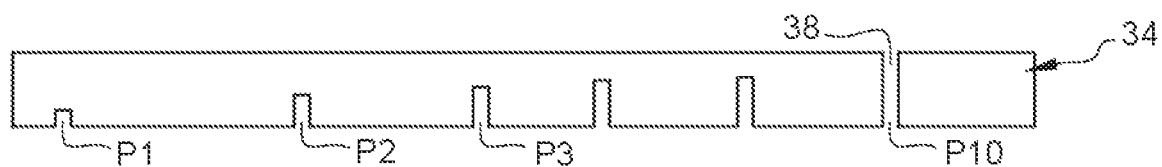
FIG. 4 is a cross section of a porous layer showing different passes necessary to produce a hole using a laser beam which illustrates a procedure of the prior art.
Figure 5:
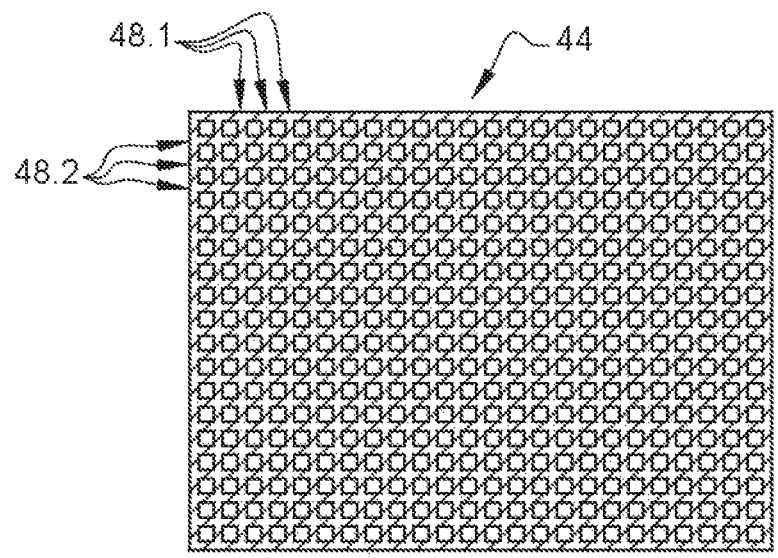
FIG. 5 is a front view of a structural frame of a porous layer which illustrates an embodiment of the disclosure herein.
Figure 10:
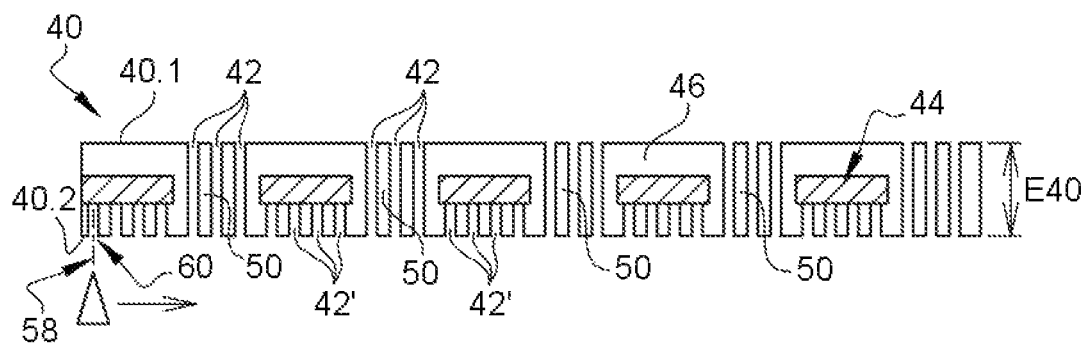
FIG. 10 is a transverse cross-section of a porous layer obtained from the solid layer that can be seen in FIG. 8 which illustrates the first embodiment of the disclosure herein.
Figure 11:
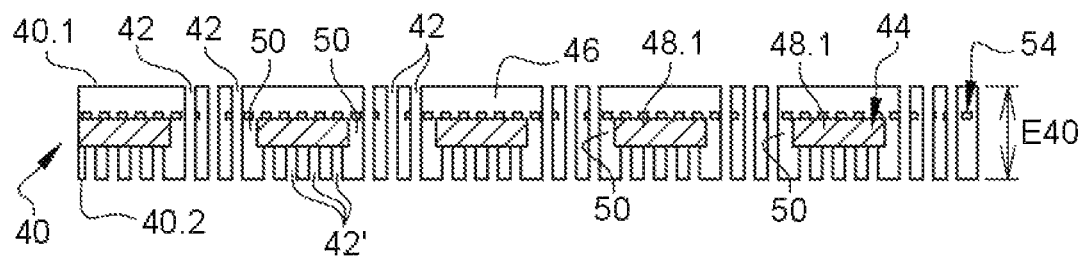
FIG. 11 is a transverse cross-section of a porous layer which illustrates a second embodiment of the disclosure herein.

In FIGS. 10 and 11, a porous layer 40 is represented in cross section that has first and second surfaces 40.1, 40.2, substantially parallel, and through-holes 42 emerging at the first and second surfaces 40.1, 40.2. According to one configuration, the porous layer 40 has a layer thickness E40 (distance between the first and second surfaces 40.1, 40.2) of between 0.4 mm and 1.5 mm. In operation, the porous layer 40 is incorporated in an acoustic attenuation structure, as illustrated in FIG. 3 for example, the first surface 40.1 being in contact with an airstream and the second surface 40.2 being linked to a cellular layer. As a variant, the porous layer 40 could be inserted between two cellular layers of an acoustic attenuation structure.

According to one application, an acoustic attenuation structure incorporating at least one porous layer 40 is positioned on a surface of a nacelle or of a turbine engine of an aircraft. Of course, the disclosure herein is not limited to this application.

The porous layer 40 comprises at least one structural frame 44 embedded in a resin matrix 46. The structural frame 44 is of metal or of composite material.

The structural frame 44 comprises first reinforcing strips 48.1, parallel to one another and oriented in a first direction, and second reinforcing strips 48.2, parallel to one another and oriented in a second direction that is secant to the first direction. According to one configuration, the first and second directions are at right angles. Of course, the disclosure herein is not limited to this arrangement.

According to one embodiment, the structural frame 44 is of woven type, the first and second reinforcing strips 48.1, 48.2 being interlaced. According to another embodiment, the structural frame 44 is of draped type, the first reinforcing strips 48.1 being positioned above or below the second reinforcing strips 48.2.

The first and second reinforcing strips 48.1, 48.2 have the same thickness E. As a variant, the first and second reinforcing strips 48.1, 48.2 could have different thicknesses. According to one configuration, the first and second reinforcing strips 48.1, 48.2 have a thickness E of between 0.4 and 1.5 mm.

The first and second reinforcing strips 48.1, 48.2 have the same width L. As a variant, the first and second reinforcing strips 48.1, 48.2 could have different widths. According to one configuration, the first and second reinforcing strips 48.1, 48.2 have a width L of between 1 and 7 mm.

The first reinforcing strips 48.1 are regularly spaced apart from one another by a distance D. As a variant, the first reinforcing strips 48.1 are not regularly spaced apart. According to one configuration, the distance D between the first reinforcing strips 48.1 is approximately equal to the width L of the first reinforcing strips 48.1. The second reinforcing strips 48.2 are regularly spaced apart from one another. As a variant, the second reinforcing strips 48.2 are not regularly spaced apart. According to one configuration, the distance between the second reinforcing strips 48.2 is approximately equal to the width of the second reinforcing strips 48.2.

Figure 7:
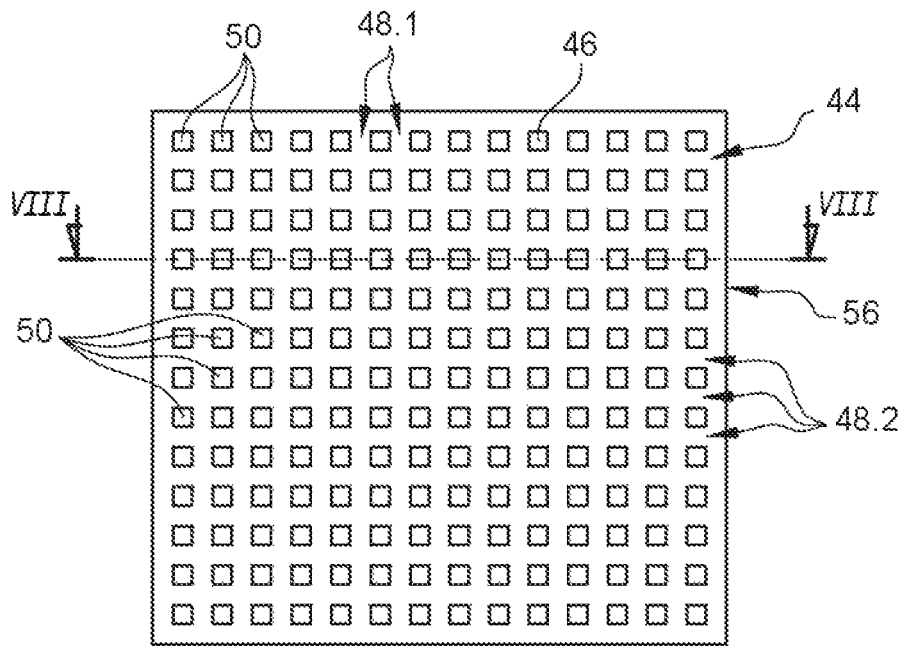
FIG. 7 is a front view of a solid layer comprising the structural frame that can be seen in FIG. 5 which illustrates the first embodiment of the disclosure herein.

According to the embodiment that can be seen in FIG. 7, the first reinforcing strips 48.1 are regularly spaced apart from one another by a distance D, like the second reinforcing strips 48.2. According to one configuration, the distance D between the first reinforcing strips 48.1 (or between the second reinforcing strips 48.2) is between 2 and 10 mm.

Whatever the embodiment, each structural frame 44 delimits zones without reinforcing strips 50 situated between the first and second reinforcing strips 48.1, 48.2.

According to one embodiment, each first or second reinforcing strip 48.1, 48.2 is a set of continuous fibers over all the length of the first or second reinforcing strips 48.1, 48.2. These fibers can be grouped together in one or more fiber rovings, in one or more fiber bands or in any other fiber arrangement. The fibers can be organic or mineral, such as for example made of carbon, of glass, of Kevlar or other materials. According to other embodiments, the first and second reinforcing strips 48.1, 48.2 can be metal.

According to one embodiment, the porous layer 40 comprises a single structural frame 44. As a variant, the porous layer 40 comprises several identical structural frames 44, superposed so that the zones without reinforcing strips 50 are positioned one on top of the other.

The structural frame 44 or the set of superposed structural frames 44 has a first outer face 44.1 and a second outer face 44.2.

The structural frame or frames 44 make it possible to pass on efforts to all of the porous layer 40, their number being determined as a function of the efforts to be passed on.

The resin of the matrix 46 can be thermoplastic or thermosetting.

Figure 6:
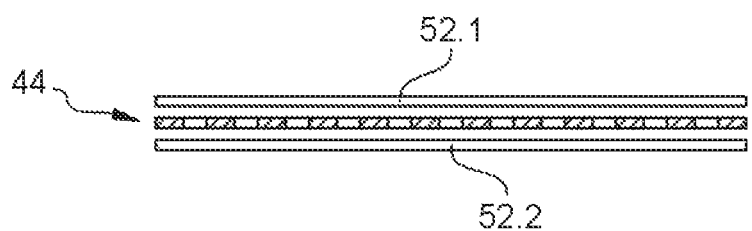
FIG. 6 is a transverse cross-section of a structural frame inserted between two resin films which illustrates a first embodiment of the disclosure herein.

According to one embodiment, the resin matrix 46 covers the first and second outer faces 44.1, 44.2 of the structural frame or frames 44. In this case, the structural frame 44 or the set of structural frames 44 is positioned between two resin films 52.1, 52.2, as illustrated in FIG. 6.

According to another embodiment, the resin matrix 46 covers only one of the first and second outer faces 44.1, 44.2 of the structural frame or frames 44. In this case, a resin film is pressed against one of the first and second outer faces 44.1, 44.2 of the structural frame or frames 44.

When the porous layer 40 comprises several structural frames 44, at least one resin film can be inserted between the structural frames 44.

Whatever the embodiment, the zones without reinforcing strips 50, situated between the first and second reinforcing strips 48.1, 48.2, are filled with resin.

Figure 12:
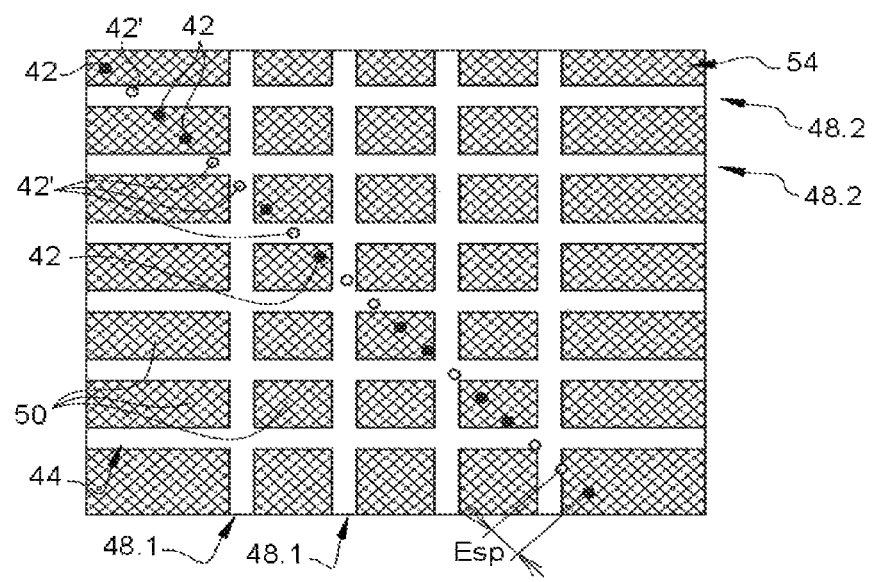
FIG. 12 is a front view of the porous layer that can be seen in FIG. 11, shown partially perforated.

According to another embodiment that can be seen in FIGS. 11 and 12, the porous layer 40 comprises at least one reinforcing film 54 positioned between two structural frames 44 or pressed against one of the first and second outer faces 44.1, 44.2 of the structural frame or frames 44. According to one configuration, this reinforcing film 54 comprises discontinuous fibers or microfibers or a glass yarn layer.

The method for manufacturing a porous layer 40 comprises a first step of production of a solid layer 56 (without the holes 42) comprising at least one structural frame 44, having first and second reinforcing strips 48.1, 48.2 spaced apart from one another in order to delimit zones without reinforcing strips 50, the structural frame 44 being embedded in a resin matrix 46 filling at least the zones without reinforcing strips 50. The solid layer 56 is conformed according to the geometry of the porous layer 40 to be produced. Thus, the solid layer 56 can be flat or curved.

According to one procedure, the structural frame or frames 44, the resin film or films 52.1, 52.2 are superposed one on top of the other on a deposition surface conformed according to the geometry of the porous layer to be produced, then are consolidated by subjecting them to a temperature and pressure cycle.

The manufacturing method also comprises a step of production of the holes 42 in the solid layer 56 using a laser beam 58. According to one procedure, the laser beam 58 moves relative to the fixed solid layer 56. According to another procedure, the solid layer 56 moves relative to the fixed laser beam 58.

The laser beam 58 comprises setting parameters adjusted to produce holes 42 of which at least one of the diameters is less than or equal to 1 mm, preferably greater than or equal to 0.05 mm and less than or equal to 1 mm.

According to a first embodiment, the holes 42 have a diameter of a dimension less than or equal to 1 mm, preferably greater than or equal to 0.1 mm and less than or equal to 1 mm.

According to a second embodiment, the holes 42 have a diameter of a dimension less than or equal to 1 mm, preferably greater than or equal to 0.05 mm and less than or equal to 1 mm.

According to a third embodiment, the holes 42 are oblong, that is to say that they are longer than they are wide. According to a first alternative, the width dimension is less than or equal to 1 mm, preferably greater than or equal to 0.1 mm and less than or equal to 1 mm. According to a second alternative, the width dimension is less than or equal to 1 mm, preferably greater than or equal to 0.05 mm and less than or equal to 1 mm.

The setting parameters comprise, in a nonlimiting manner, a power, a focus, a frequency, a wavelength, etc.

As a nonlimiting example, the laser can be an "Ultra Short Pulse" laser.

The laser beam 58 successively impacts the solid layer 56 in impact zones 60. The setting parameters of the laser beam 58 are adjusted so that the temperature in the impact zones 60 is maintained within a range of temperatures greater than a sublimation temperature of the resin of the matrix 46.

According to a first setting mode, the setting parameters of the laser beam 58 are adjusted so that the temperature in the impact zones 60 is maintained within a range of temperatures less than a temperature of alteration of the fibers of the structural frame or frames 44.

The structural frame 44 or the set of structural frames 44 has a frame thickness E. The setting parameters of the laser beam 58 are adjusted as a function of the frame E and layer E40 thicknesses so that the laser beam 58 produces, in at most three passes, through-holes 42 in the zones without reinforcing strips 50 and blind holes 42' in the first and second reinforcing strips 48.1, 48.2 that do not alter or alter very little their mechanical characteristics.

each pass, the laser beam 58 makes it possible to produce a drill hole of several hundreds of micrometres in the zones without reinforcing strips 50.

Figure 8:
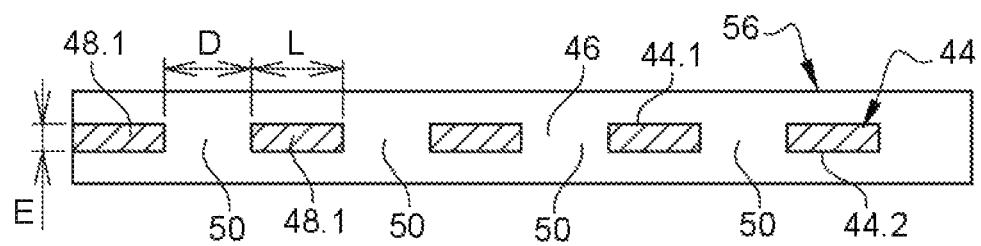
FIG. 8 is a transverse cross-section of the solid layer along the line VIII-VIII of FIG. 7.
Figure 9:
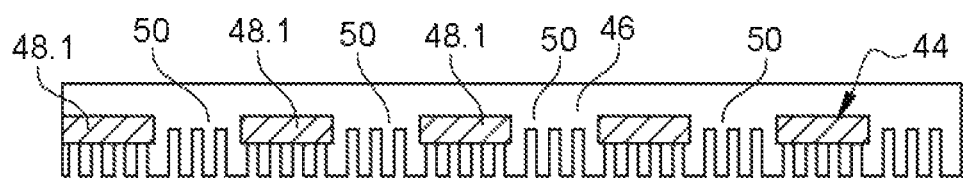
FIG. 9 is a transverse cross-section of the solid layer that can be seen in FIG. 8 after a first drilling pass using a laser beam which illustrates the first embodiment of the disclosure herein.

According to an embodiment that can be seen in FIGS. 8 to 10, it is possible to produce the through-holes 42 in two passes. If the thickness E40 of the porous layer 40 does not exceed a certain threshold, it is possible to produce the through-holes 42 in a single pass and to go directly from FIG. 8 to FIG. 10.

The laser beam 58 is moved, above all the surface of the solid layer 56, so as to successively produce the holes 42, 42' by sweeping, as illustrated in FIG. 12. The spacing Esp between two holes 42, 42' is determined so that the open surface ratio TSO is between 4 and 18%. As an indication, the spacing Esp is between 1 and 4 times the diameter of the holes 42.

According to the disclosure herein, the through-holes 42, situated in the zones without reinforcing strips 50, are totally open and are not encumbered with fibers so that the open surface for the calculation of the open surface ratio TSO is equal to the sum of the drilling sections of the through-holes 42. Thus, given identical drilling sections and open surface ratio TSO, the porous layer 40 comprises a less great number of through-holes 42 inasmuch as, for each of them, the totality of the drilling section is effective and unencumbered with fibers.

According to another procedure, the geometry of the structural frame or frames being known, it is possible to perform the sweep of the laser beam 58 only vertically above the zones without reinforcing strips 50.

The disclosure herein makes it possible to obtain a uniform open surface ratio of all of the porous layer 50 and therefore to optimize the acoustic treatment. Since the through-holes 42 have a diameter less than 1 mm, the impact on aerodynamic performance is limited.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a porous layer of an acoustic attenuation structure, the method comprising:
   a first step of production of a solid layer comprising at least one structural frame having first reinforcing strips that are parallel and spaced apart from one another, and second reinforcing strips that are parallel and spaced apart from one another and secant with the first reinforcing strips, the first and second reinforcing strips delimiting zones without reinforcing strips, the structural frame being embedded in a resin matrix filling at least the zones without reinforcing strips; and a second step of production of through-holes in the zones without reinforcing strips of the solid layer using a laser beam parameterized to produce holes and for a temperature in impact zones of the laser beam to be maintained within a range of temperatures greater than a temperature of sublimation of the resin of the matrix.

2. The method for manufacturing a porous layer of claim 1, wherein the laser beam is parameterized so that the temperature in the impact zones is maintained within a range of temperatures less than a temperature of alteration of fibers of the structural frame or frames.

3. The method for manufacturing a porous layer of claim 1, wherein the through-holes are produced by a sweep of the laser beam only vertically above the zones without reinforcing strips.

4. The method for manufacturing a porous layer of claim 1, wherein the solid layer is obtained by stacking at least one structural frame and at least one resin film on a deposition surface, conformed according to a geometry of the porous layer to be produced, then by consolidating them.

5. The method for manufacturing a porous layer of claim 1, wherein the through-holes are spaced apart so that the porous layer has an open surface ratio of between 4 and 18%.

6. The method for manufacturing a porous layer of claim 1, wherein the first and second reinforcing strips are regularly spaced apart by a distance of between 2 and 10 mm.

7. The method for manufacturing a porous layer of claim 1, wherein the first and second reinforcing strips have a width of between 1 and 7 mm.

8. The method for manufacturing a porous layer of claim 1, wherein the first and second reinforcing strips have a thickness of between 0.4 and 1.5 mm.

9. The method for manufacturing a porous layer of claim 1, wherein the laser beam is parameterized to produce holes of which at least one of the dimensions is less than 1 mm.

* * * * *